United States Patent [19]

Janssen et al.

[11] Patent Number: 5,186,031
[45] Date of Patent: Feb. 16, 1993

[54] SELF-DESTRUCT ELECTRICAL INTERLOCK FOR CYLINDER LOCK AND KEY SET

[75] Inventors: David C. Janssen, Whitefish Bay; Larry R. Grimmer, Sussex, both of Wis.

[73] Assignee: Briggs & Stratton Corporation, Milwaukee, Wis.

[21] Appl. No.: 747,617

[22] Filed: Aug. 20, 1991

[51] Int. Cl.⁵ .................. E05B 47/00; E05B 63/00
[52] U.S. Cl. ............................ 70/277; 70/278; 70/371; 70/422; 70/495; 200/43.08
[58] Field of Search ............... 70/1.5, 1.7, 252, 277, 70/278, 369, 371, 373, 416, 422, 495, 496; 200/43.08, 43.04, 334; 307/10.1, 10.2

[56] References Cited

U.S. PATENT DOCUMENTS

| | | | |
|---|---|---|---|
| 3,402,582 | 9/1968 | Jacobi | 70/371 |
| 3,442,102 | 5/1969 | Butts | 70/422 |
| 3,651,329 | 3/1972 | Marlowe et al. | 70/422 |
| 3,794,796 | 2/1974 | Dwan | 70/1.7 X |
| 4,074,547 | 2/1978 | Seidewand | 70/1.5 |
| 4,074,548 | 2/1978 | Milton | 70/1.5 |
| 4,454,736 | 6/1984 | Mochida | 70/422 |
| 4,458,512 | 7/1984 | Gelhard | 70/277 |
| 4,630,457 | 12/1986 | Kincaid et al. | 70/369 |
| 4,737,762 | 4/1988 | Ohnishi | 70/1.5 X |

FOREIGN PATENT DOCUMENTS 0044071 3/1980 Japan .................. 70/416

Primary Examiner—Lloyd A. Gall
Attorney, Agent, or Firm—Andrus, Sceales, Starke & Sawall

[57] ABSTRACT

A cylindrical lock and key set with an electronic interlock circuit includes a self-destruct circuit portion which is intercepted, engaged and destructed by an intercept member when the cylinder is forcibly, axially removed from the lock sleeve. A second intercept member may engage the circuit and destruct it when the cylinder is forcibly rotated. Either or both of the intercept members may be located on the cylinder.

18 Claims, 3 Drawing Sheets

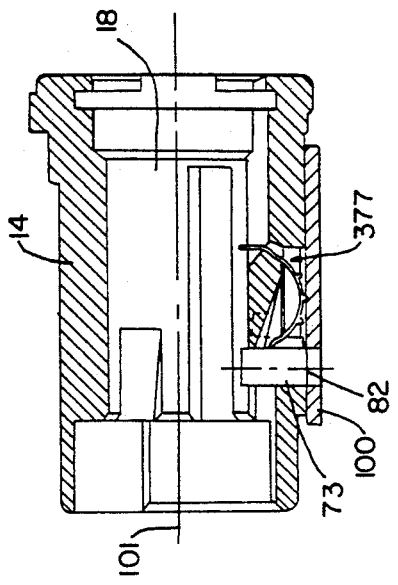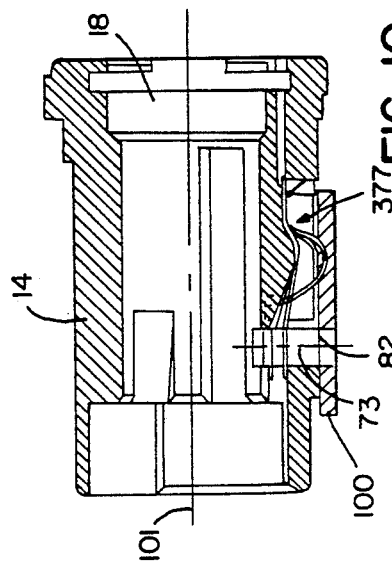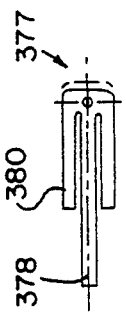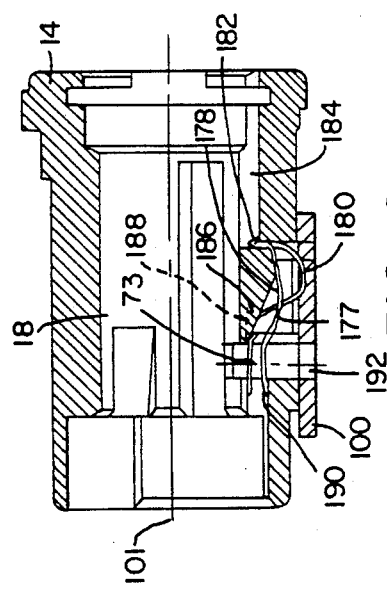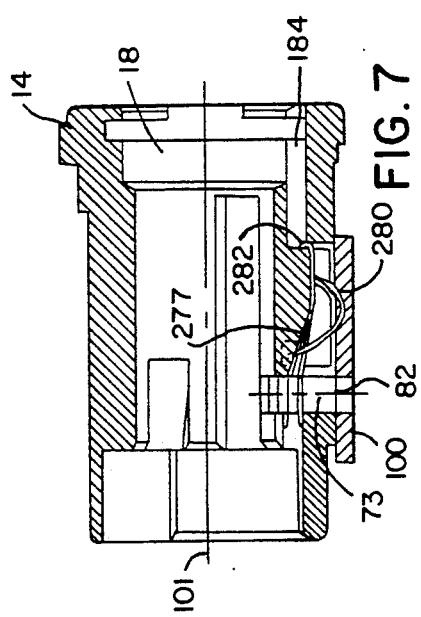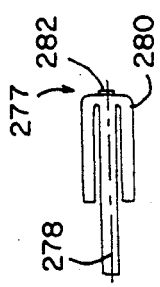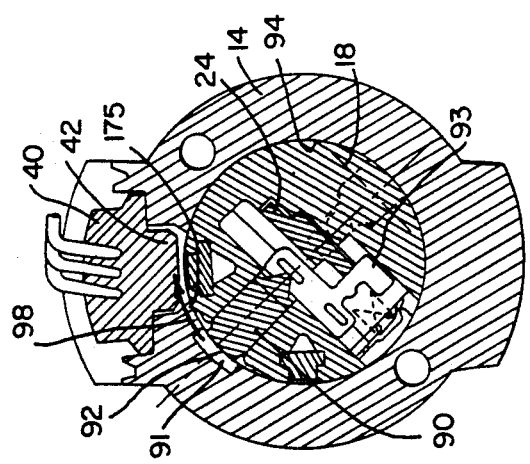

SELF-DESTRUCT ELECTRICAL INTERLOCK FOR CYLINDER LOCK AND KEY SET

BACKGROUND OF THE INVENTION

1. Field of the Invention

The subject invention is generally related to cylindrical lock and key sets and is specifically directed to a cylindrical lock and key set having an electrical interlock which is disabled when the cylinder is forcibly removed.

2. Description of the Prior Art

The subject invention is related to the co-pending application entitled "ANTI-TAMPERING MAGNET FOR AUTOMOBILE IGNITION LOCK", Ser. No. 07/607,583, filed on Nov. 1, 1990 by D. Janssen and assigned to the assignee herein.

Over the last several years, it has become increasingly desirable to improve the anti-tampering feature of lock and key sets. This is particularly true with respect to automobile ignition systems where auto theft has almost developed into an art form. Skilled thieves can often "hot wire" an automobile ignition in a manner of a few seconds. Typically, the key and cylinder lock for engaging and energizing the ignition system is either bypassed or pulled in order to facilitate the theft. To combat this, automotive manufacturers have incorporated a variety of vehicle anti-tampering systems (VATS) to make vehicle theft more difficult. Numerous of these include electrical or electronic interlocks working in cooperation with a mechanical lock system. For example, one such system includes a resistor element on the mechanical key and a circuit connection contained within the bezel or knob of the cylinder of the key lock. When a mated key with the proper resistance level is inserted in the cylinder, the circuit is closed and the proper coded voltage is produced, permitting the ignition to energize in typical fashion when the cylinder is rotated. If a key with an improper resistance level is used, the proper voltage is not produced and the rotation of the cylinder will not enable the ignition system.

In another example, a sensor is placed at a certain point in the rotation of the cylinder and senses proper rotation of the cylinder to produce an ignition activation signal. Any attempt to start the ignition without first properly rotating the cylinder is ineffective since proper rotation is required to generate the ignition activation signal. There are instances where the cylinders have been forcibly pulled from the sleeve and modified to override the electronic interlock and then reinserted to activate the ignition. Prior art devices have not successfully dealt with this problem.

While the need for VATS ignitions in automobiles has created the development of the electronic interlock technology, it will be readily apparent that there are a wide variety of uses for which the interlock systems can be incorporated. The electronic interlock systems for the vehicle ignition circuits are readily adaptable to any lock and key set utilizing a key with a rotating cylinder lock.

SUMMARY OF THE INVENTION

While the systems of the prior art have greatly enhanced the anti-tampering features of lock systems, it is desirable to improve upon these systems by making it more difficult, if not impossible, for a thief to "hot wire" or activate the ignition system of the car once the cylinder has been removed from the lock. In this regard, it is desirable that the electronic interlock system be disabled when the cylinder is forcibly removed from the lock, which is a common initial action in an effort to "hot wire" or activate an ignition system in an unauthorized manner.

The subject invention provides for an electronic interlock circuit including a frangible portion which may be intercepted and destructed to create an open circuit condition upon unauthorized removal of the cylinder from the cylinder retaining sleeve of the lock and key set. In the preferred embodiment, the anti-tampering device includes an intercept mechanism which is located on and extends radially outward from the cylinder. A portion of the electrical interlock circuitry is disposed in the path of the intercept mechanism. When the cylinder is forcibly, axially removed from the sleeve, the intercept engages this portion of the circuit and breaks it to create an open circuit condition, thereby precluding completion of the interlock circuit and disabling the ignition system.

In the preferred embodiment, the intercept device comprises the cylinder retainer for normally retaining the cylinder within the sleeve. The retainer is mounted in the cylinder and is movable between a recessed position and an extended position, being normally biased into the extended position by biasing means such as a spring. Once the cylinder is inserted into the sleeve in the proper manner, the retainer moves to the extended position to engage a portion of the sleeve, precluding axial movement of the cylinder from the sleeve unless a predetermined pull force is applied to the cylinder. A portion of the electronic interlock circuit is disposed in the sleeve in the path of the extended cylinder retainer. When an adequate pull force is applied to the cylinder, the retainer is pulled through and engages and destructs the portion of the circuit so disposed.

The electronic circuitry for the interlock is contained in a module which is disposed in a mated receptacle contained in the sleeve. A frangible portion of the circuit protrudes outwardly from the module and is disposed in an aperture in the sleeve and in the path of the extended cylinder retainer. As the cylinder is forcibly removed from the sleeve, the extended retainer engages and destructs both the housing and the circuit portion therein.

In its preferred form, the sleeve includes an integral clamp for mechanically holding the circuit module in the receptacle and may include a frangible wall portion between the housing receptive aperture and the retainer, to further increase the pull force required to remove the cylinder from the lock set. When the cylinder is forcibly removed from the sleeve, the extended cylinder retainer first engages and destructs the frangible wall of the sleeve and then engages and destructs frangible housing and circuit portion of the electronic interlock module.

It is, therefore, an object and feature of the subject invention to provide for an electronic interlock system for a cylindrical lock and key set wherein the electronic interlock is disabled when the cylinder is removed from the lock in an unauthorized manner.

It is also an object and feature of the subject invention to provide for a cylindrical lock and key set with a mated cylinder and sleeve, wherein the sleeve contains an electrical circuit which self-destructs and precludes activation of a controlled element when the cylinder is forcibly removed from the sleeve.

It is yet another object and feature of the subject invention to provide for a cylindrical lock and key set having a sleeve adapted for containing an electronic interlock module having a frangible self-destruct member which is intercepted and destructed when the cylinder is forcibly removed from the sleeve.

It is also an object and feature of the invention to provide for a cylindrical lock and key set having an electronic interlock which is disabled when a predetermined pull force is applied to the cylinder to remove the cylinder from the sleeve.

Other objects and features of the invention will be readily apparent from the accompanying drawing and description of the preferred embodiment.

BRIEF DESCRIPTION OF THE DRAWING

FIG. 5 is a section view taken generally along the line 5—5 of FIG. 3.

FIG. 6 is a diagrammatic view of a sleeve and cylinder with an alternate means for retaining the sleeve in assembled relationship with the cylinder.

FIG. 7 is a view similar to FIG. 6 showing another embodiment for retaining the cylinder in assembled relationship with the sleeve.

FIG. 8 is a plan view of an alternate spring retaining clip.

FIG. 9 is a view similar to FIG. 7 illustrating another alternate embodiment for retaining the cylinder in assembled relationship with the sleeve.

FIG. 10 is a view similar to FIG. 9 showing another embodiment for retaining the cylinder in assembled relationship with the sleeve.

FIG. 11 is an alternate embodiment of a spring retaining clip.

DETAILED DESCRIPTION OF THE PREFERRED EMBODIMENT

Figure 1:
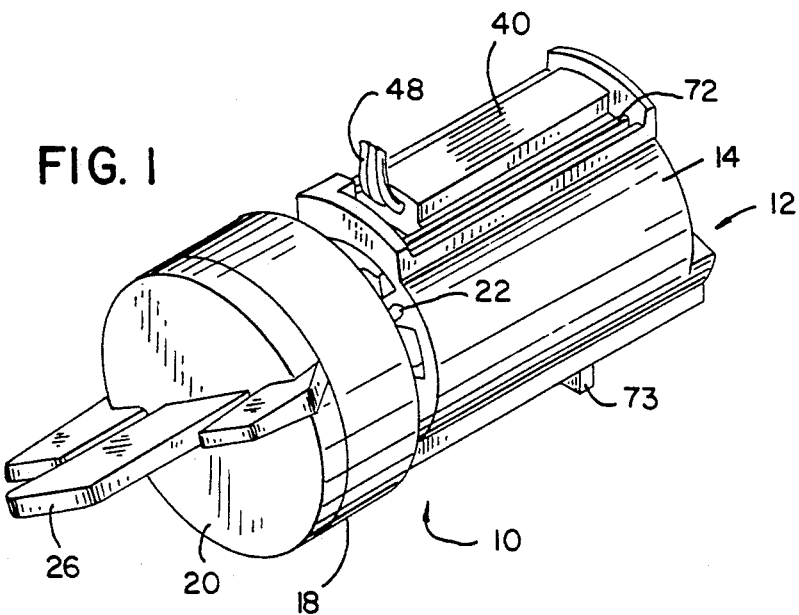
FIG. 1 is a perspective view of a cylindrical lock and key set in accordance with the subject invention.
Figure 2:
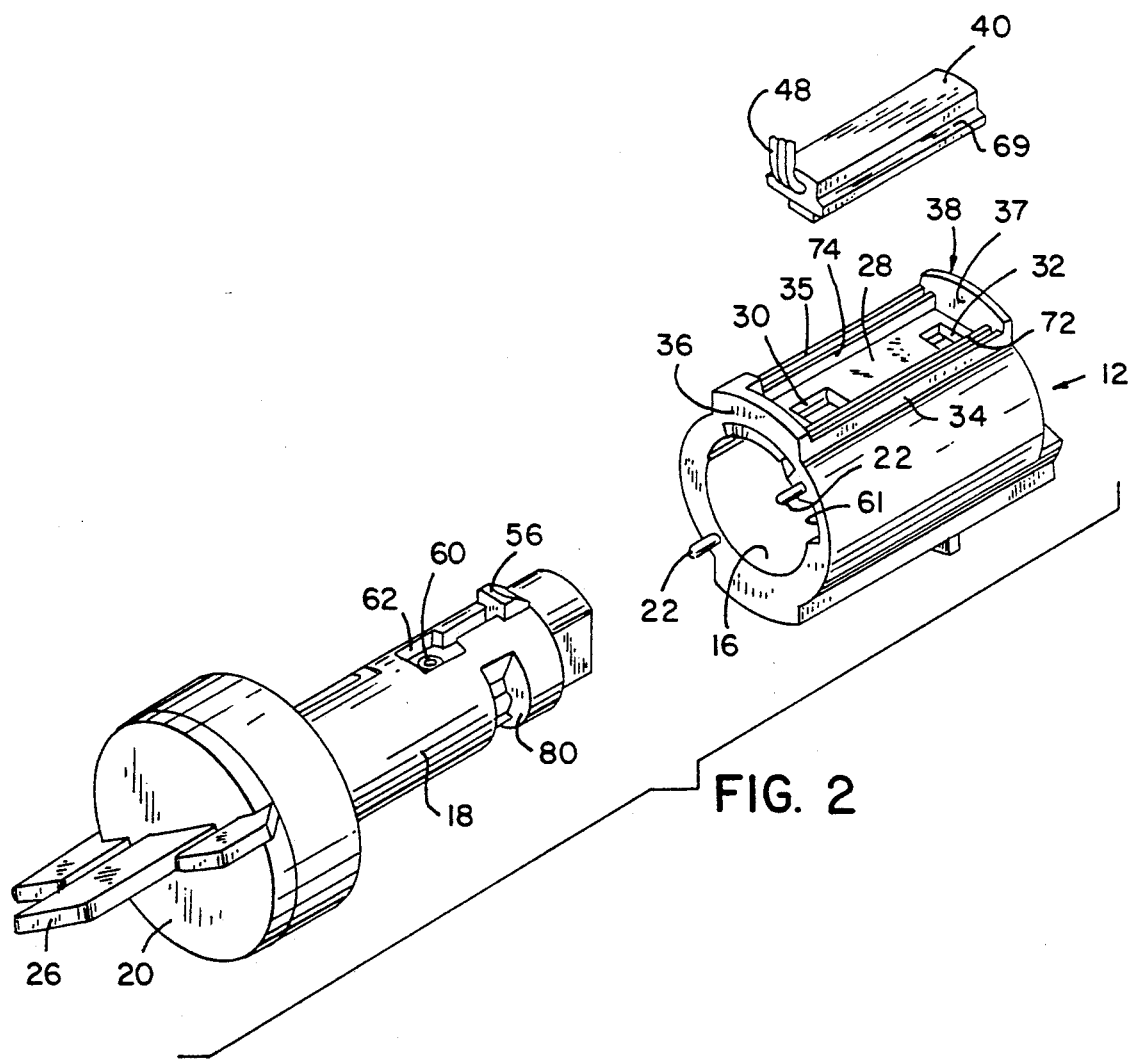
FIG. 2 is an exploded perspective view of the lock and key set of FIG. 1.

As shown in FIGS. 1 and 2, the cylindrical lock and key set 10 of the subject invention includes a sleeve 12 having an outer peripheral surface 14 and an inner core 16 for receiving the rotatable cylinder 18, in the manner well known to those skilled in the art.

Figure 3:
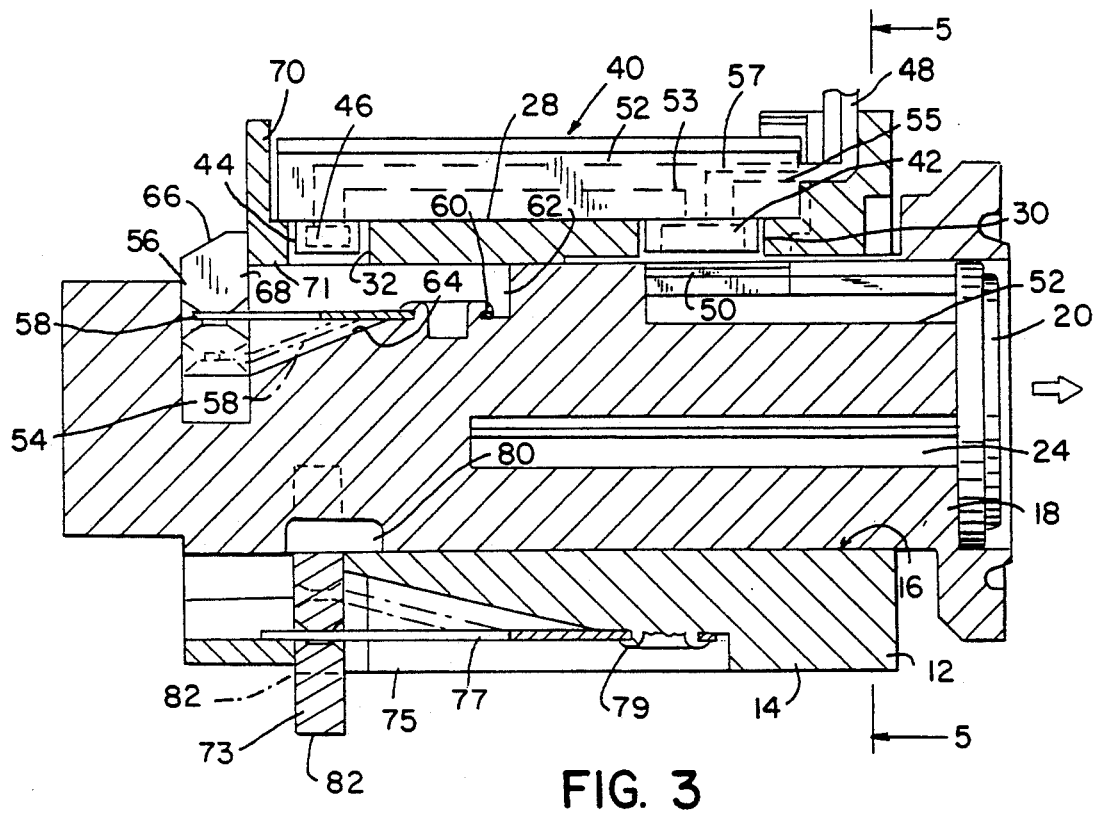
FIG. 3 is a side view, in section, of the lock and key set illustrated in FIG. 1.

As is typical, the sleeve and cylinder are coaxial. The cylinder 18 terminates in a cap or knob 20 which encloses the open end of the sleeve and engages a pair of resilient detent pins 22, in the well-known manner, when the cylinder is inserted in the sleeve as shown in FIGS. 1 and 3. The cylinder 18 includes a key slot 24 (see FIG. 3) for receiving a mated key 26. In typical use, the key includes a notched edge (not shown) for engaging a plurality of tumblers (not shown) contained in the cylinder, wherein insertion of a properly mated key permits rotation of the lock cylinder within the sleeve to unlock or enable a controlled element, in the well-known manner.

In the preferred embodiment, the sleeve 12 includes a flat boss 28 on its outer peripheral surface 14. A pair of apertures 30 and 32 are included in the sleeve and communicate the boss with the inner core 16. Integral raised side walls 34, 35 and end walls 36, 37 are provided about the periphery of the boss 28 and define a receptacle 38 in the sleeve for receiving the electronic interlock module 40. As is best shown in FIG. 3, the electronic interlock module includes a sensor element 42 which is disposed in aperture 30 and a frangible, self-destruct housing 44 which is disposed in aperture 32. Electrical connectors or leads 48 extend outwardly from the module 40 to provide for electrical connections of the interlock module with other circuit components of the system.

The sensor 42 is adapted to read the rotational position of the cylinder 18 by sensing the signal generated by an element such as the permanent magnet 50 disposed in the longitudinal channel 52 of the cylinder, as shown in FIG. 3.

A portion of the electrical circuitry, typically a resistor element 46 which is connected to the sensor element 42 via the wire 53 is disposed in the frangible housing 44 of the module. The wire 52 connects the resistor to harness 48 and wires 55 and 57 provide power and ground connections to the sensor via harness 48.

The cylinder 18 includes an integral recess 54 for receiving a cylinder retainer 56. The cylinder retainer 56 is mounted on a biasing means such as the wire spring 58, which is secured to the cylinder 18 by suitable means such as swaging as shown at 60. The channel 54 permits the retainer 56 to be depressed into a recessed position, as shown in phantom in FIG. 3, whereby the cylinder may be inserted into the sleeve. Clearance recess 62 is provided in the cylinder and has an inclined surface 64 for accommodating the wire spring 58 when the retainer is in the recessed position. Typically, the retainer includes a beveled edge 66 for facilitating axial movement of the cylinder into the sleeve. When the cylinder 18 is properly inserted in the sleeve 12, the wire spring 58 is operative to urge the retainer 56 into the extended position shown in FIG. 3, wherein the retainer protrudes radially outwardly from the outer perimeter of the cylinder.

In the preferred embodiment, one edge 68 of the retainer 56 is in engagement with the innermost edge 70 of the sleeve 12. The wall portion 71 of the sleeve 12 is disposed between the frangible housing 44 of module 40 and the end wall 68 of the retainer 56. In order to properly remove the cylinder 18 from the sleeve 12, it is necessary either to retract the retainer 56 into the channel 54 in order to clear the sleeve or to rotate the cylinder such that the retainer is aligned with the longitudinal slot 61 in the sleeve (FIG. 2). Typically, this cannot be done without the key after the lock is properly installed in an operating system such as the steering column of an automobile. Therefore, unless the cylinder is removed in the proper manner, with the mated key in place, the cylinder can only be removed from the sleeve by applying a pull force to the cylinder sufficient to overcome the retention forces of the cylinder 18, the wall portion 71 of the sleeve and/or the retainer 56, as shown in FIG. 4.

Figure 4:
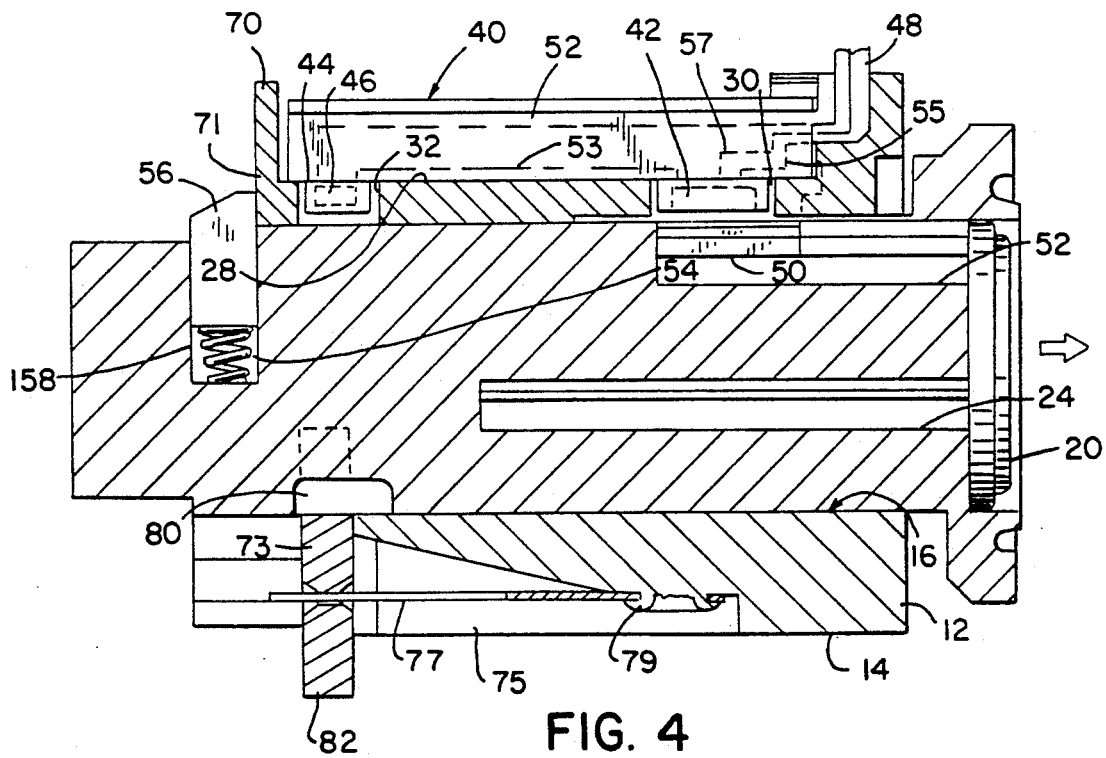
FIG. 4 is a view similar to FIG. 3, illustrating an alternative embodiment of the lock and key set.

As shown in FIG. 4, the wire spring 58 can be replaced with the coil compression spring 158 which fits directly in the bottom end of channel 54. This eliminates the need for the enlarged cavity 62 in the cylinder 18. Also, it is possible to provide a stationary retainer 56, with installation utilizing the aforementioned channel 61.

In the preferred embodiment of the subject invention, the sleeve wall portion 71 is designed of a thickness to provide the weakest retention capability of the three components which may be most typically destroyed when a pull force is applied to the cylinder in an effort to forcibly remove the cylinder from the sleeve. That is, the frangible wall portion 71 of the sleeve is designed to yield or deform before the retainer 56 or the cylinder 18. In a typical installation, the cylinder 18, retainer 56 and sleeve 12 are made of zinc alloy. By providing a thin wall section 71, the pull force required to deform the wall 71 is approximately 1200 pounds. As the cylinder is forcibly, axially removed from the sleeve, the retainer 56 first engages and destructs the frangible sleeve wall 71 and then engages and destructs the housing 44 containing the frangible portion of the circuit, thereby breaking the circuit between sensor element 42 and the harness 48 disabling the electronic interlock system.

In the preferred embodiment, the sensor module 40 is of a molded nylon construction and the housing 44 requires substantially less force applied against it to self-destruct than the pull force required to engage and deform the frangible sleeve wall 71.

As is best shown in FIG. 2, the module 40 includes a rim or lip 69 extending about at least a portion of its lower perimeter. When the module is placed in the receptacle 38, the inner walls or rail 72, 74 of the receptacle may be swaged over, as shown in FIG. 1 to engage the lip 69 and retain the module in the receptacle. This means and method of assembly renders it impractical, if not impossible, to remove the module 40 without permanently destructing it.

In the preferred embodiment, the sleeve includes a retainer 73 housed in a recess 75 provided in the outer perimeter of the sleeve. The retainer is mounted on a resilient biasing member such as the wire spring 77, which is secured to the sleeve by suitable means such as swaging as shown at 79. A recess channel 80 is provided in the cylinder 18 to permit depression of the retainer into its recessed position when the cylinder is rotated to a specific angular position within the sleeve. When the sleeve retainer 73 is in its recessed position, as shown in phantom in FIG. 3, the outer end 82 of the retainer is flush with the outer peripheral surface 14 of the sleeve. This permits the assembled sleeve and cylinder lock set to be installed in a suitable, mated receptacle, after which the wire spring 77 urges the retainer into its extended position, as shown in FIGS. 3 and 4 for retaining the lock and key set in the installation.

As shown in FIG. 5, the self-destruct interlock configuration of the subject invention is also designed to guard against forced rotation of the cylinder 18 relative to the sleeve 14. As will be readily understood by those skilled in the art, when a properly bitted key is inserted in the key slot 24 of the cylinder 18, the side bar element 90, controlled by the locking tumblers 93 is withdrawn to bring the tip 92 of the side bar into alignment with the outer perimeter 94 of the cylinder. This permits rotation of the cylinder 18 in the sleeve 14 to activate the controlled element. Typically, an elongate channel 91 is provided in the sleeve into which the tip 92 of the side bar extends when the key is removed. This precludes rotation of the cylinder 18 in the sleeve 14 unless a properly bitted key is inserted in the key slot 24. However, there have been instances where a forced rotation of the cylinder in the sleeve can be accomplished, generally destroying the sleeve element 14 but resulting in an unauthorized activation of the controlled element. As shown in FIG. 5, a portion of a frangible wall 175 is disposed adjacent the slot 91. If a forced rotation in the direction of arrow 98 is attempted while the tip 92 of the side bar is projecting into the slot 91, the side bar 90 will break through the frangible wall portion 175 and intercept the frangible, self-destruct housing and the sensor element 42, interrupting the electrical circuit contained therein precluding activation of the controlled element.

FIGS. 6–11 illustrate various embodiments for controlling the movement of the sleeve retainer 73 for holding the assembled cylinder 18 and sleeve 14 in a mounting receptacle 100. As shown in FIG. 6, the spring 177 may include a leaf spring actuator 178 which serves the same purpose as the leaf spring 77 (FIGS. 1-4) and a parallel retainer 180 in place of the staked retainer 79 (also FIGS. 1-4), permitting the mechanism to be made of a unitary spring element. The common end 182 of the actuator 178 and retainer leg 180 is disposed in a slot 184 provided in the sleeve. The opposite end 186 of the retainer leg 180 is disposed in a slot or aperture 188 provided in the sleeve. This mechanical assembly is suitable for retaining the sleeve retainer 73 in the sleeve assembly, wherein as the sleeve is axially inserted along its axis 101, the outer portion of the hoop defined by the retainer leg 180 is engaged and compressed by sleeve receptacle 100 for retaining the retainer clip 177 in permanent assembly. The outer end 190 of the actuator 178 is disposed in the retainer 73 and normally urges retainer 73 into the slot 192 provided in the receptacle 100.

A similar configuration is shown in FIGS. 7 and 8, wherein the spring retainer clip 277 includes a plurality of retainer legs 280 and 281.

The retainer clip 377 shown in FIG. 9 is similar to that shown in FIG. 6. However, instead of a clip 182 being provided for holding the retainer in assembled relationship in the slot 184, the retainer is staked into the sleeve in a manner similar to the staking of retainer clip 77 as shown in FIG. 3. The embodiment of FIGS. 10 and 11 is similar to the retainer clip of FIG. 7, including a pair of retainer legs 381 and 382 with an aperture 378 at the base of the retainer for staking or swaging the retainer into the sleeve in the same manner as the retainer clip of FIG. 9 and FIG. 3.

It will be readily understood that other retaining means are equally well suited for use in connection with the subject invention.

While certain features and embodiments of the invention have been described in detail herein, it will be readily understood that the invention includes all modifications and enhancements within the scope and spirit of the following claims.

What is claimed is:

1. An anti-tampering device for a mechanical lock of the type having a sleeve with an outer peripheral surface, a hollow inner core having a longitudinal axis, a rotatable cylinder adapted to be longitudinally inserted in the hollow inner core of the sleeve, and a mated key operable for unlocking and rotating the cylinder when the key is inserted in a key slot in the cylinder, the lock further including an electrical interlock circuit which is enabled when the key is inserted in the key slot and the cylinder is properly rotated, the anti-tampering device comprising:

a. a frangible housing associated with the sleeve of the lock for containing a portion of the electrical interlock circuit; and b. intercept means associated with the cylinder and adapted for intercepting and destructing both the frangible housing and the circuit portion therein when said cylinder is forcibly, axially removed from said sleeve, whereby enabling of the electrical interlock circuit is precluded.

2. The anti-tampering device of claim 1, further including second intercept means associated with the cylinder and adapted for further intercepting and destructing the electrical interlock circuit when said cylinder is forcibly, rotationally moved relative to said sleeve, whereby enabling of the electrical interlock circuit is precluded.

3. The anti-tampering device of claim 1, wherein the intercept means further comprises:
   a. a cylinder retainer mounted in the cylinder and movable between a recessed position and an extended position, the retainer adapted for clearing the frangible housing when in the recessed position and for intercepting the frangible housing when in the extended position; and
   b. means for normally biasing the retainer into the extended position.

4. The anti-tampering device of claim 3, wherein the outer peripheral surface of the sleeve includes an integral receptacle for receiving the interlock circuit.

5. The anti-tampering device of claim 4, said sleeve further including a through aperture for communicating the hollow core with the receptacle, said frangible housing being disposed in said aperture, the sleeve further including a frangible wall adjacent said aperture and disposed between said aperture and said retainer when the cylinder is in the sleeve, and wherein said retainer is adapted for intercepting the frangible sleeve wall before intercepting the frangible housing when the cylinder is forcibly, axially removed from the sleeve.

6. The anti-tampering device of claim 5, wherein the electrical interlock circuit is contained in a circuit module adapted to be received by said receptacle, the frangible housing being an integral portion of said module and being adapted to be received by said aperture.

7. The anti-tampering device of claim 6, wherein said receptacle further includes raised side and end walls adapted for protecting the module when said module is placed in said receptacle.

8. The anti-tampering device of claim 6, wherein the module further includes a rim extending about at least a portion of the outer perimeter thereof and wherein the receptacle further includes an integral clamp adapted for engaging said rim and retaining said module in the receptacle.

9. The anti-tampering device of claim 1, wherein the sleeve includes:
   a. a sleeve retainer mounted therein and movable between an extended position and recessed position, wherein the retainer protrudes beyond the outer peripheral surface of the sleeve when extended and is flush with the outer peripheral surface of the sleeve when recessed; and
   b. means for normally biasing the sleeve retainer into the extended position.

10. An anti-tampering device for a mechanical lock of the type having a sleeve, a rotatable cylinder in the sleeve and a mated key operable for unlocking and rotating the cylinder when the key is inserted in a key slot in the cylinder, the lock further including an electrical interlock circuit, the anti-tampering device comprising:
    (a) means associated with the sleeve for containing a portion of the electrical interlock circuit;
    (b) destruct means responsive to axial movement of the cylinder for intercepting and destructing said portion of the electrical interlock circuit, whereby enabling of the electrical interlock circuit is precluded and
    (c) a frangible wall in the sleeve adjacent said circuit portion, wherein the destruct means includes a protruding intercept member extending radially outward from the cylinder and adapted for intercepting and destructing said frangible wall and said circuit portion when the cylinder is axially removed from the sleeve.

11. The anti-tampering device of claim 10, further including a second destruct means responsive to rotational movement of the cylinder for further intercepting and destructing the electrical interlock circuit, whereby enabling of the electrical interlock circuit is precluded.

12. An anti-tampering device for a mechanical lock of the type having a sleeve including an outer peripheral surface, a hollow inner core having a longitudinal axis, a rotatable cylinder adapted to be inserted in the hollow inner core of the sleeve and co-axial therewith, and a mated key operable for unlocking and rotating the cylinder when the key is inserted in a key slot in the cylinder, the lock further including an electrical interlock circuit which is enabled when the key is inserted in the key slot and the cylinder is properly rotated, the anti-tampering device comprising:
    a. an integral receptacle in the outer peripheral surface of the sleeve for receiving the electrical interlock circuit;
    b. an aperture in said sleeve for communicating the receptacle with the inner core;
    c. at least a portion of said interlock circuit being disposed in said aperture;
    d. an intercept member mounted on the cylinder and protruding radially outward therefrom and adapted for intercepting and destructing the circuit portion in said aperture when the cylinder is forcibly, axially removed from said sleeve, whereby enabling of the electrical interlock circuit is precluded.

13. The anti-tampering device of claim 12, further including a second intercept member selectively and radially movable between a position protruding outwardly from the cylinder and a position disposed within the cylinder and adapted for further intercepting and destructing the electrical interlock circuit when in the protruding position and the cylinder is forcibly rotationally moved relative to said sleeve, whereby enabling of the electrical interlock circuit is precluded.

14. The anti-tampering device of claim 13, wherein said second intercept member comprises a side bar which is movable between a projecting position and a recessed position in response to the insertion of a properly mated key in said cylinder.

15. The anti-tampering device of claim 12, wherein said sleeve further includes a frangible wall adjacent said aperture and disposed between said aperture and said intercept member when the cylinder is in the sleeve, and wherein said intercept member is adapted for intercepting the frangible sleeve wall before intercepting the circuit portion in said aperture when the cylinder is forcibly, axially removed from the sleeve.

16. The anti-tampering device of claim 12, wherein the electrical interlock circuit is contained in a circuit module adapted to be received by said receptacle, the module including an integral frangible housing adapted to be received in said aperture, said circuit portion being contained in said frangible housing, wherein said intercept member is adapted for intercepting and destructing both the frangible housing and the circuit portion therein when the cylinder is forcibly, axially removed from said sleeve.

17. The anti-tampering device of claim 16, wherein the module further includes a rim extending about at least a portion of the outer perimeter thereof, the receptacle further including an integral clamp adapted for engaging said rim and retaining the module in the receptacle.

18. The anti-tampering device of claim 16, wherein the intercept member further comprises a cylinder retainer mounted in the cylinder and movable between a recessed position and an extended position, the retainer adapted for clearing the frangible housing when in the recessed position and for intercepting the frangible housing when in the extended position, and means for normally biasing the cylinder retainer into the extended position, and wherein the sleeve further includes a sleeve retainer mounted therein and movable between an extended position and a recessed position, the sleeve retainer adapted for protruding beyond the outer peripheral surface of the sleeve when in the extended position and for being flush with the outer peripheral surface of the sleeve when in the recessed position, and means for normally biasing the sleeve retainer into the extended position.

* * * * *